United States Patent [19]

Gray

[11] 4,022,984

[45] May 10, 1977

[54] TELEPHONE ANSWERING SERVICE CONSOLE

[76] Inventor: Steven M. Gray, 625 Biltmore Way, Coral Gables, Fla. 33134

[22] Filed: June 18, 1976

[21] Appl. No.: 697,674

[52] U.S. Cl. .............................................. 179/91 R
[51] Int. Cl.² ........................................ H04M 5/02
[58] Field of Search .......................... 179/91, 27 FH

[56] References Cited

UNITED STATES PATENTS 1,515,698  11/1924  Rand ........................... 179/91 R X Primary Examiner—William C. Cooper
Attorney, Agent, or Firm—Ernest H. Schmidt

[57] ABSTRACT

A telephone answering service console for use in an answering service system accepting incoming calls through a pair of standard telephone lines provided with "call forwarding" and "call waiting" service is described. The console has a desk level main deck which supports control panels and a numerical directory of subscriber accounts, before which the console operator is stationed, and a directory deck in spaced, parallel relation above the main deck supporting thereupon a plurality of arcuately arranged, upstanding subscriber account alphabetical listing directory board, the console further comprising a plurality of upstanding rows of message racks, one for each subscriber account, arcuately arranged between the main and directory decks.

10 Claims, 11 Drawing Figures

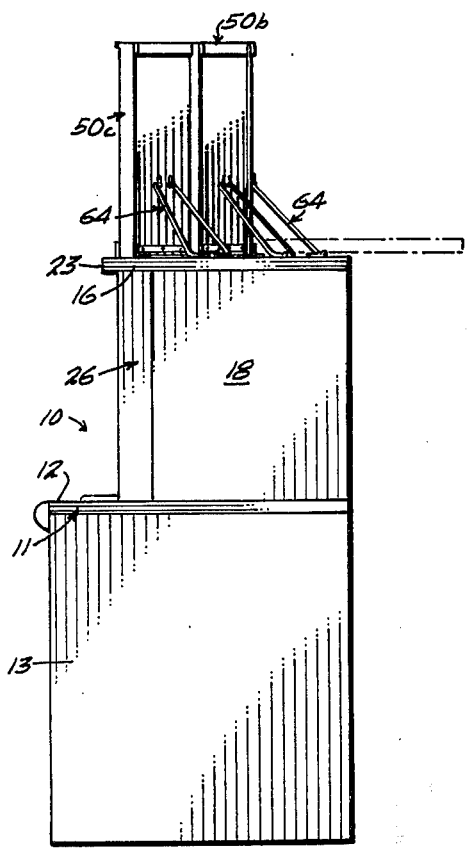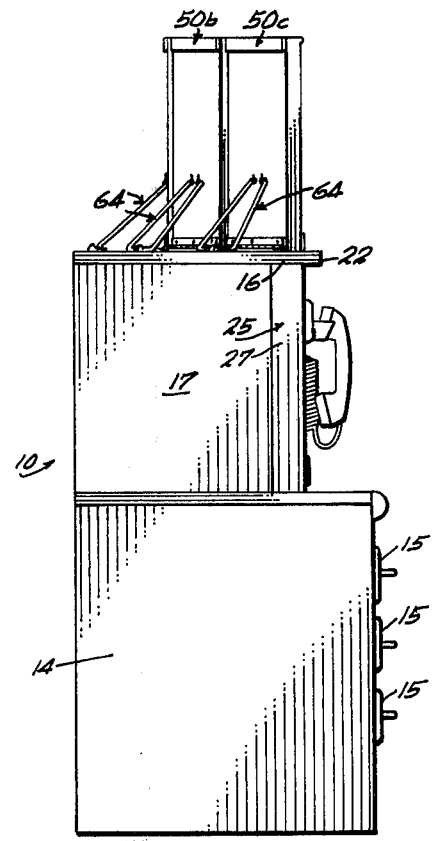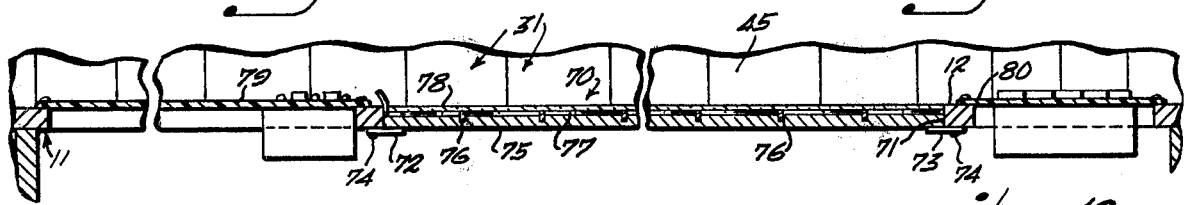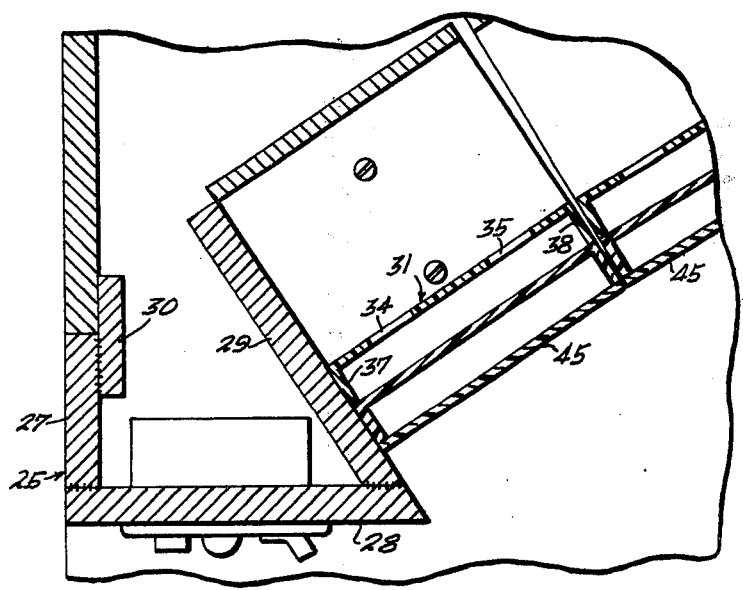

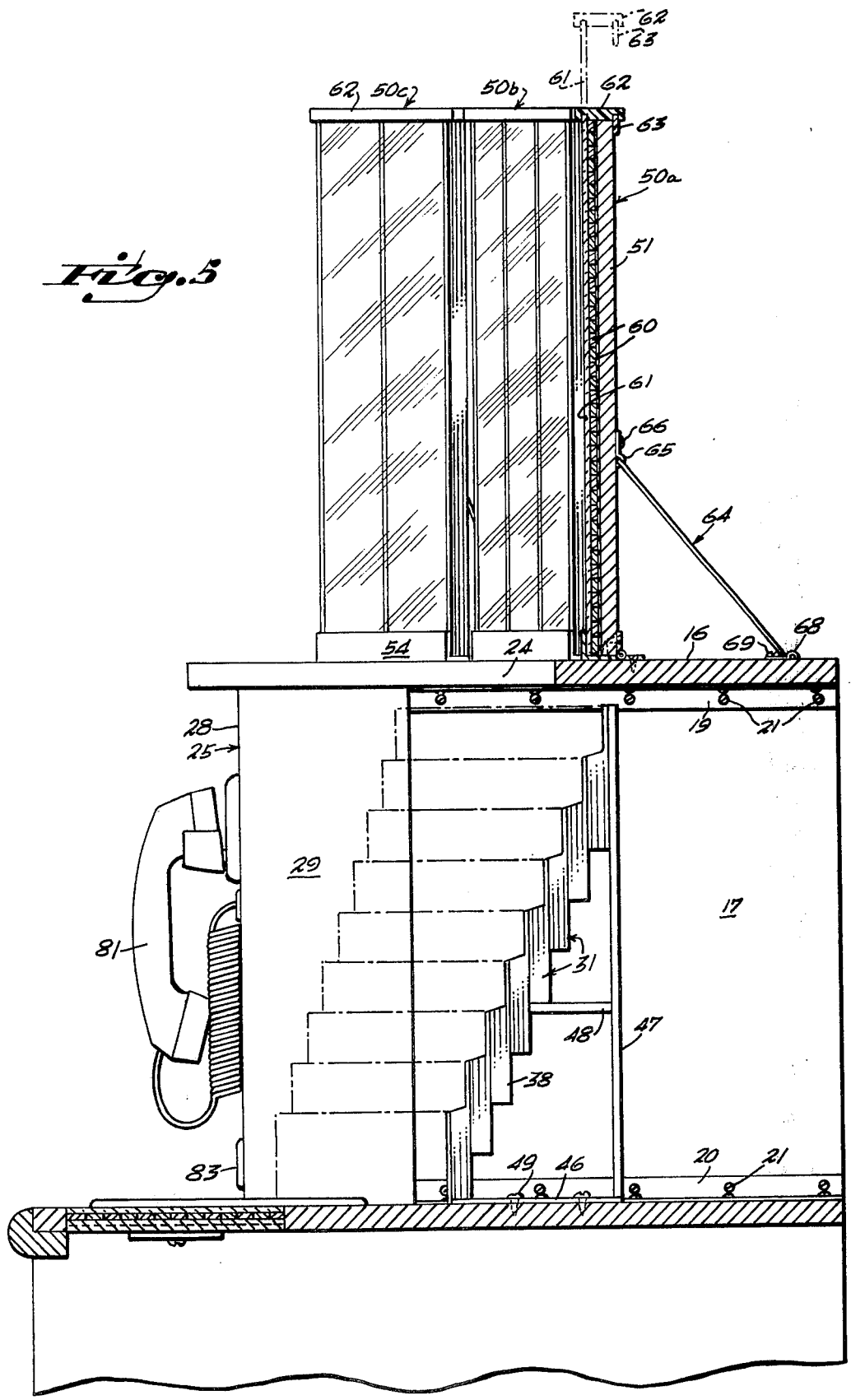

TELEPHONE ANSWERING SERVICE CONSOLE

This invention relates to live telephone answering service equipment and is directed particularly to a telephone answering service console designed to accept incoming calls through standard telephone lines provided with call forwarding and call waiting service by the telephone company system in association with which the answering service is provided.

By utilizing the optional call forwarding and call waiting service features of ordinary incoming telephone lines and wherein upwards of 100 answering service subscriber accounts can be accommodated by a single console serviced by only two of such incoming telephone lines. The call waiting feature of each line permits either of two calls to come in on the same line at the same time. The console operator, therefore, may have a maximum of four simultaneous calls. As is more particularly described in my co-pending system application, previously recorded messages can be played over additional simultaneous incoming call lines apologizing for the operator's slight delay in answering while she completes the last received incoming call or calls. If the delay should be for more than a few seconds, the console operator has at her disposal appropriate second, third or even a fourth pre-recorded message to be played over waiting incoming calls until such time as she is free to service such calls personally. As a practical matter, taking into consideration the number of incoming messages that can be expected over peak message load periods and the ability of a console operator to talk live with more than one incoming caller at a time, it has been found that 125 or more answering service subscriber accounts can be served by a single console embodying the features of the present invention and operated by an experienced telephone answering service operator.

It is, accordingly, the main objective of this invention to provide a telephone answering service console utilizing the call forwarding and call waiting service features of a pair of ordinary incoming telephone lines in a telephone answering service system as described above.

It is the principal object of this invention to provide a telephone answering service console of the above nature which is so designed with respect to manually controlled switches and other operational components, the disposition of subscriber account alphabetical and numerical directories, and the arrangement and design of message racks, as to provide maximum physical and visual access for optimum efficiency of console operation.

A more particular object of the invention is to provide a telephone answering service console of the character described having a desk level main deck supporting within its upper surface and along its length a main control panel, a sub-panel and a numerical directory of subscriber accounts between the main and control panels, and further comprising a directory deck in spaced, parallel relation above the main deck and supporting a plurality of arcuately arranged, upstanding subscriber account alphabetical listing directory boards, and a plurality of upstanding rows of message racks, one for each subscriber account, between the main and directory decks and similarly arcuately disposed, the arrangement being such to provide for maximum accessibility and visibility of the various console features to be utilized by the console operator in efficiently transacting call answering, message taking and message relaying service.

Another object of the invention is to provide a telephone answering service console of the above nature which is so designed with respect to its visual display and the associated dispostion of its sub-panel as to provide for auxiliary operation by a trainee operator, for example, to service overload calls received during peak traffic periods, thereby further expanding the number of service accounts that can be accommodated. In answering service offices having more than one main console of the type herein described, intermediate or auxiliary consoles can be installed to permit a trainee operator to respond to calls from consoles on either side during peak traffic periods, the master consoles being designed to be "mirror images" of themselves so as to afford maximum convenience and efficiency of operation to each of the three operators.

Still another object of the invention is to provide a telephone answering service console of the above nature wherein the upstanding subscriber account alphabetical listing directory boards are pivotally hinged to the top of the directory deck so as to enable their being moved from their upright positions of use to backward displacement flat against against the upper horizontal surface of the directory deck to facilitate the replacement and rearrangement of subscriber account alphabetical listing strips along stacked rows of such listings in the directory boards, as may be required from time to time.

Other objects, features and advantages of the invention will be apprent from the following description when read with reference to the accompanying drawings. In the drawings, wherein like reference numerals denote corresponding parts throughout the several views:

FIG. 3 is a right side elevational view thereof;

FIG. 4 is a left side elevational view thereof;

FIG. 5 is a central, vertical cross-sectional view taken along the line 5—5 of FIG. 1 in the direction of the arrows;

FIG. 10 is a fragmentary vertical cross-sectional view taken along the line of 10—10 of FIG. 2 in the direction of the arrows and illustrating constructional details of the main deck assembly; and FIG. 11 is a fragmentary, transverse cross-sectional view taken along the line 11—11 of FIG. 1 in the direction of the arrows and illustrating assembly details of the console.

Figure 1:
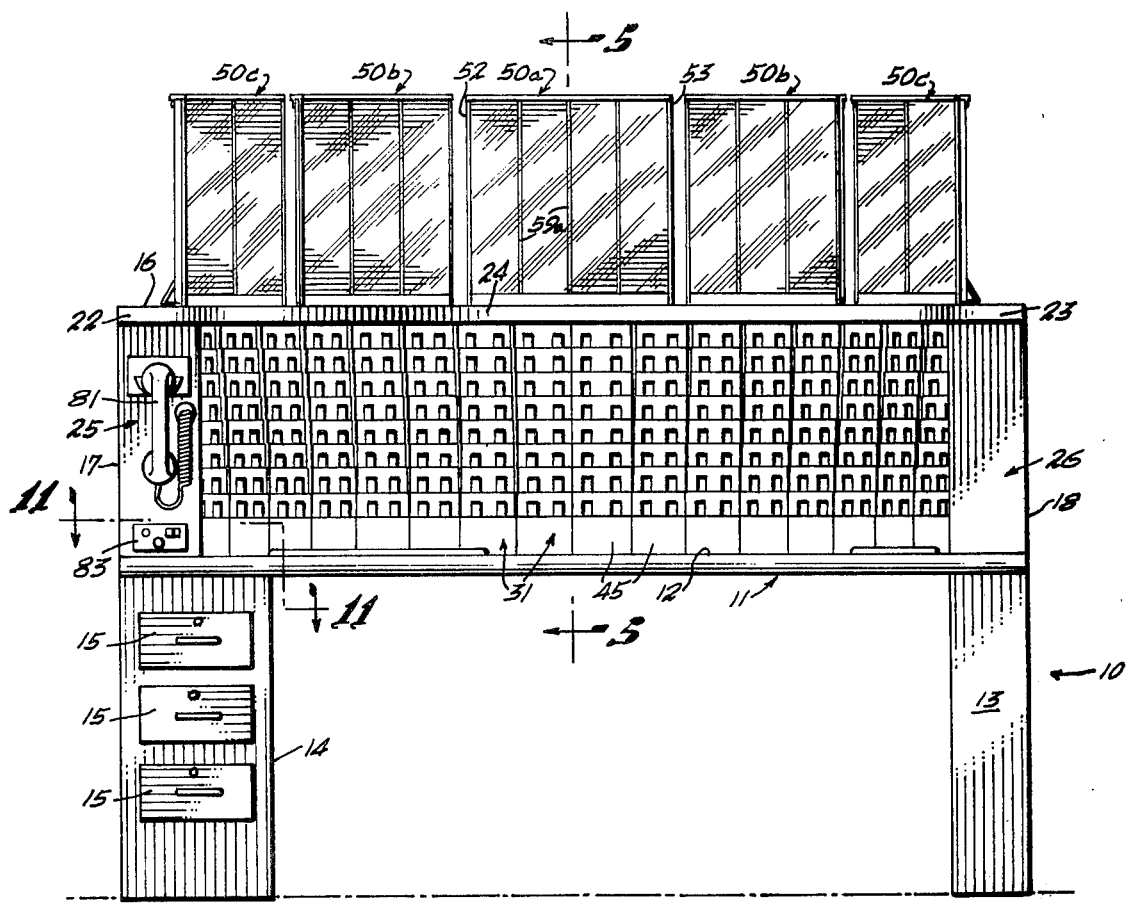
FIG. 1 is a front elevational view of a preferred form of telephone answering console embodying the invention.

Referring now in detail to the drawings, reference numeral 10 designates, generally, a preferred form of telephone answering service console embodying the invention. The console 10 comprises a desk-like table 11 having a rectangular top or main deck 12 supported at the right side, as illustrated in FIG. 1, by a substantially rectangular box-like pedestal or leg 13 and at the opposite side by a comparatively wide, rectangular, box-like pedestal 14 carrying three vertically-aligned slide drawers 15. Supported in spaced, parallel relation above the main deck 12 is an alphabetical directory deck 16, said directory deck being secured in position above the main deck by left and right sidewall panels 17 and 18 extending therebetween and fixed in place as by upper angle bracket members 19 and lower angle bracket members 20 fastened by screws 21 (see FIG. 5).

Figure 2:
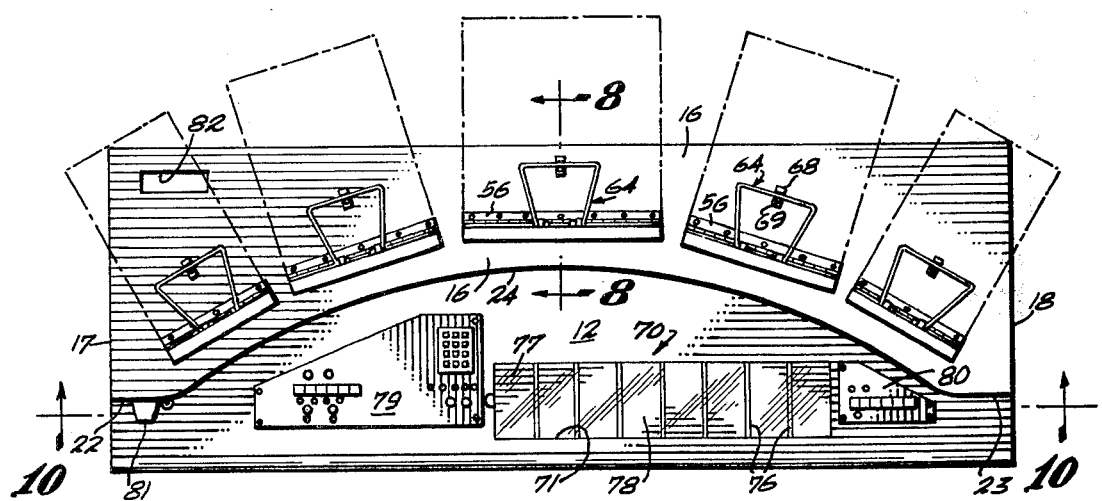
FIG. 2 is a top view thereof.

As best illustrated in FIG. 2 the directory deck 16 is formed with short front portions of decreased width, as indicated at 22 and 23 in FIG. 2, the inner ends of which merge with the ends of a symmetrical, arcuate recess 24. As illustrated in FIG. 1, the space below the foreshortened ends 22, 23 of the directory deck 16 have fitted therein left and right front corner filler panels 25,26 respectively. As illustrated in FIG. 11, the front corner filler panels 25, 26 each comprise an outsprise an outside wall member 27, a front wall member 28 and an angularly inwardly-directed inside wall portion 29. Cleat strips 30 glued or otherwise secured along the inside of the outside wall members 17 and extending forwardly outwardly thereof provide right-angular abuttment recesses for the interfitting reception of vertical front marginal portions of sidewall panels 17 and 18, respectively.

Figure 6:
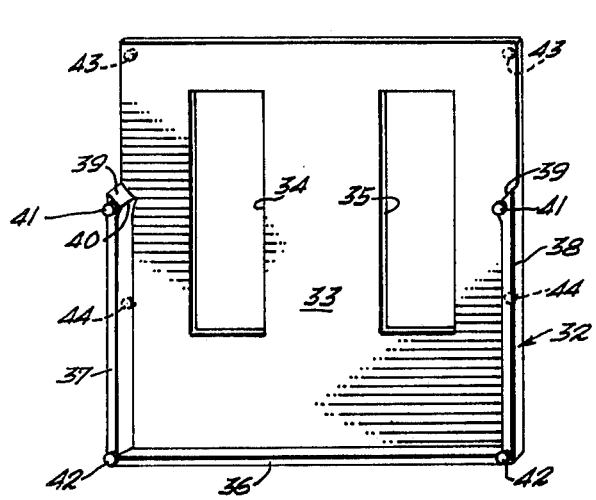
FIG. 6 is a front perspective view of one of the integrally molded shell members comprising the message rack.
Figure 7:
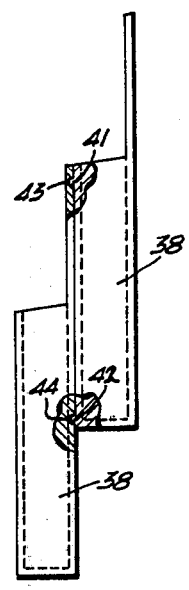
FIG. 7 is a side elevational view illustrating how the individual shell members are assembled to fabricate the message racks.

Arcuately arranged in upstanding relation between the main deck 12 and the directory deck 16 is a plurality of message racks 31. The message racks 31 are comprised of a plurality of shell members 32, fabricated of a tough synthetic plastic material by injection molding, for example. As illustrated in FIG. 6 and 7, the shell members 32 each comprise a rectangular back wall portion 33 having symmetrically spaced, vertical through openings 34,35, a bottom wall 36, and sidewall portions 37, 38 extending upwardly of said bottom wall to a distance slightly greater than one-half the height of said back wall portion. The upper ends of the sidewall portions 37,38 terminate in downwardly and inwardly-sloped end faces 39,39 merging at their inner ends with inner wall portions of the sidewall portions 37,38 to define opposed, inwardly-projecting edges 40,40 (only one edge visible in FIG. 6). The outer edges of the sidewall portions 37,38 are formed, at their upper end, with short, round, perpendicularly outwardly-extending corner bosses 42,42. The rear surface of the back wall portion 33 of the shell members 32 are also integrally formed with a first pair of circular recesses 43,43 in the upper corners, and a second pair of circular recesses 44 in spaced relation below the respective recesses 33,33. The bosses 41,41 and 42,42 are vertically and horizontally spaced by the same distances as are the circular recesses 33,33 and 44,44, so as to permit keyed interfitting of a plurality of shell members 32 in vertically-extending relation, as illustrated, by way of example, in FIG. 7. The message racks are thus fabricated by cementing a plurality of the shell members 32 in interfitting relation, eight shell members 32 being thus assembled to fabricate each of the message racks 31 in the embodiment of the invention herein illustrated and described. As illustrated in FIG. 1, the front of the bottom shell member 32 of each of the message rack 31 is fitted with a rectangular, cemented-in-place closure wall 45, which is integrally formed with circular corner recesses (not illustrated) for interfitting reception of the bosses 41,41 and 42,42 of the lowermost shell member 32.

The message racks 31 are each provided with a rearwardly-extending, rectangular base 46, an upright support member 47 extending between the rear surface of the uppermost shell member 32 and the outer end of the base 46, and a horizontal brace 48 secured between the underside of the fifth-from-bottom shell 32 and an inner surface portion of said upright support member. The message racks 31 are of such width that a plurality of 16 fit side-by-side in arcuate disposition between the inside wall portions 29 of the left and right-hand front corner filler panels 25,26 (see FIGS. 1,2 and 11), extending vertically between the main deck 12 and the directory deck 16 and being secured in place as by screws 49 (see FIG. 5).

Swingably hinged along their lower ends to the top of the console directory desk 16, and arranged in arcuate disposition thereupon, slightly rearwardly of the edge of the arcuate recess 24 thereof, (see FIGS. 1 through 5) are a plurality of directory boards 50a; 50b,50b;and 50c,50c. The various alphabetical directory board, 50a,50b and 50c each have a plurality of partitioned, vertically-extending rows, each of which is adapted to receive a plurality of vertically stacked, changeable name slides, as hereinafter more particularly described. The directory board 50a,50b,50c differ only in the number of their partitioned name slide rows, and corresponding width. Constructional details of the center directory board 50a only, as illustated in FIGS. 1,2, 8 and 9, are therefore described herein by way of example.

Figure 9:
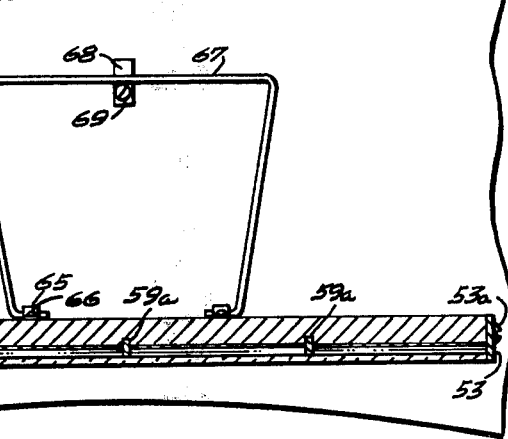
FIG. 9 is a horizontal cross-sectional view taken along the line 9—9 of FIG. 8 in the direction of the arrows.
Figure 8:
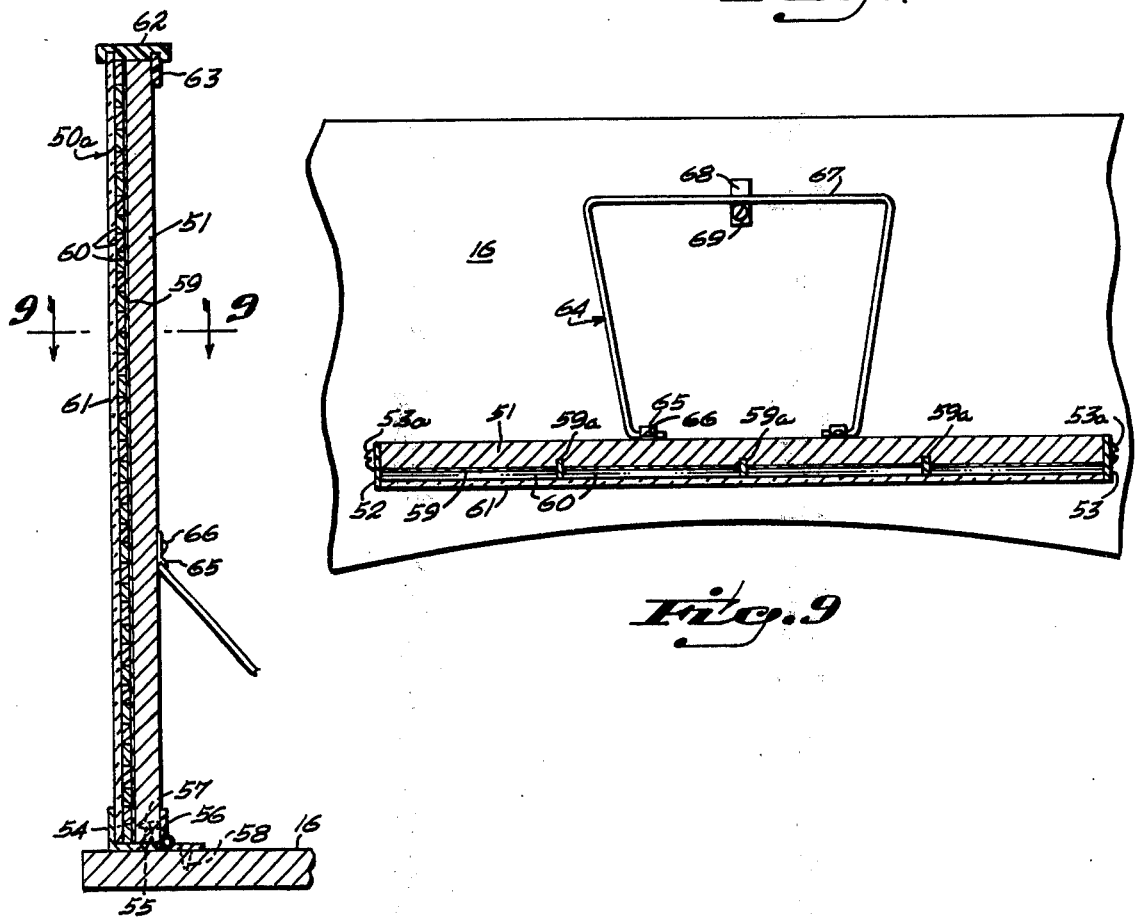
FIG. 8 is a vertical cross-sectional view along the line 8—8 of FIG. 2 in the direction of the arrows and illustrating constructional details of a typical alphabetical directory board.

As illustrated in FIGS. 8 and 9, the directory board 50a comprises a rectangular backing board 51 along the opposite side edges of which are respective sheet-metal strips 52,53, respectively, secured in place as by screws 53a. As best illustrated in FIG. 9, the side strips 52, 53, each project outwardly somewhat forwardly of the front face of the back board 51. Secured along the bottom of the back board 51 is a right-angular member 54, said right-angular member being secured in place as by screw 55 (see FIG. 8). A piano hinge 56 secured between a lower marginal back surface portion of the board 51 and the top of the directory deck 16 as by screws 57,58 permits pivotal swinging of the directory board between the upright position as illustrated in FIG. 8 and the backwardly-displaced position flat against the directory deck, as illustrated by the broken-line representation thereof in FIG. 2. As further illustrated in FIGS. 8 and 9, the front or upper surface of the directory back board 51 has cemented or otherwise affixed thereto a cover layer of felt 59. As illustrated in FIG. 9, vertically-extending divider strips 59a mortised in the front of the back board 51 divide the front surface thereof into a plurality of rows of equal width. Each of these rows is adapted to receive, vertically slidable therealong, a plurality of name slides 60, which are changeable in the manner and for the purpose hereinafter appearing. A transparent face plate 61, preferably of a clear synthetic plastic material, fits slidingly between the back board side strips 52,53 to be retained at the bottom by fitting within the recess defined by upwardly-projecting portion of the bottom angle member 54. A cap strip 62 having a downwardly-extending, coextensive retainer flange 63 is mortised along its underside near the front thereof to receive an upper marginal end portion of the face plate 61 to retain said face plate in assembled relation (see FIG. 8).

A symmetrically-bent, stiff wire brace member 64 has open end portions pivotally secured with respect to the rear surface of the back board 51 as by journal clips 65 sucured in place as by screw 66. The pivotal brace 64 has a horizontally-extending outer end portion 67 which is removably retained with respect to an abutment clip 68 secured to the top of the directory deck 16 as by a screw 69 for supporting directory board in upright or use position as illustrated in FIGS. 1,3,4,5 and 9.

As illustrated in FIGS. 2,5 and 10, a numerical directory 70 is arranged within the rectangular main deck 12, being fitted within a rectangular opening 71 therein extending in spaced, parallel relation with respect to the front rounded end of said main deck and disposed somewhat to the left of center (see FIG. 2). The numerical directory 70 rests with opposed marginal underside portions thereof against abutment cleats 62,63, secured to an extending outwardly of the underside of the main deck 12 at each of the opening 71, said cleats being secured in place as by screws 74.

The numerical directory 74 comprises a rectangular back board 75 having mortised therein a plurality of equidistantly-spaced, front-to-back divider strips 76 defining front-to-back recesses for the removable reception of a plurality of individual numbered name plates 77. A transparent cover 78, preferably of a clear synthetic plastic material of the same size as the main directory opening 71, is removably fitted over the numbered name plates 77, the assemblage being such the upper surface of said transparent cover will lie substantially flush with the upper surface of the main deck 16 within which it is removably received.

As best illustrated in FIG. 2, openings are provided in the main deck 12 for the reception of a main control panel 79, slightly to the left of the numerical directory 70, and a sub-panel 80, disposed slightly to the right of said numerical directory. The front wall member 28 of the left front corner filler panel 25, as illustrated in FIGS. 1,2 and 5, is equipped with a telephone handset 81, for use by a supervising console operator, for example. A main switch panel 83 is mounted below the telephone hand-set 81. As illustrated in FIG. 2, an opening is provided in the back left-hand corner of the directory deck 16 for the reception of the upper end of a recorded tape cartridge playback equipment for use in playing back selected pre-recorded messages to answering service subscribers awaiting live console operator response during periods of multiple incoming call reception.

In use of the console, the console operator, having in full view an alphabetical directory of any listed subscriber account name that may be referred to by a call-transferred party wishing to communicate with any such listed person at any particular subscriber telephone station, can readily cross-index with the corresponding account number as listed in the numerical subscriber list directory to readily give or take handwritten messages on slips deposited or to be deposited in a correspondingly numbered message hold receptacle comprising the message racks, there being one of such message receptacles for each numbered account.

An important feature of the invention resides in the fact that the alphabetical and numerical subscriber account directories are so designed that their subscriber listing strips can be rearranged, substituted for, and added to from time to time, as required, simple by removing their respective transparent cover plates and manipulating the subscriber account strips in horizontal position along their pertaining rows or columns. In this connection it will be understood that the alphabetical directory boards can readily be swung downwardly from their upright position of use to rest against the top of the directory deck for easily effecting such change or rearrangement of the listings.

While I have illustrated and described herein only one form in which my invention can conveniently be embodied in practice, it is to be understood that this form is given by way of example only and not in a limiting sense. The invention, in brief, comprises all the embodiments and modifications coming within the scope and spirit of the following claims.

What I claim as new and desire to secure Letters Patent is:

1. A telephone answering service console comprising, in combination, a desk-like console member having a horizontal main deck supported by laterally-opposed pedestal members, a directory deck member, means supporting said directory deck member in spaced parallel relation above said main deck member, said directory deck support means defining a vertically-extending space between said main deck and said directory deck, a plurality of message slip racks arranged in said space between said main deck and said directory deck, each of said message racks comprising a plurality of vertically-stacked message slip receptacles, a plurality of subscriber account name directories supported upon said directory deck for visual display to a console operator stationed in front of the console, a subscriber account numerical directory supported in horizontal disposition by said main deck and substantially flush with said main deck for ready visual observation by the console operator, and call receiving and switching means mounted in said main deck.

2. A telephone answering service console as defined in claim 1, wherein said call receiving and switching means comprises a main control panel arranged at one side of said subscriber account numerical directory and an auxiliary control panel arranged at the other side of said subscriber account numerical directory.

3. A telephone answering service console as defined in claim 1, wherein said plurality of subscriber account name directories each comprises a rectangular back board, a plurality of rectangular, elongated subscriber designation strips, means for supporting said plurality of designation strips in stacked relation upon said back board, and removable transparent cover means for retaining said designation strips in stacked relation with respect to said back board, said back board being pivotally secured along a bottom edge portion thereof to said directory deck to permit swinging thereof between substantially upwardly-extending position and horizontal position, selectively, with respect to said directory deck.

4. A telephone answering service console as defined in claim 3, wherein said subscriber account numerical directory comprises a second back board, means dividing said second back board into a plurality of front-to-back recesses for the removable reception of a second plurality of rectangular, elongated, subscriber designation strips, and transparent cover member removable fitted over the designation strips supported by said second back board.

5. A telephone answering service console as defined in claim 4, wherein said rectangular back board and its associated designation strips and transparent cover member are removably received within a recess provided in said main deck.

6. A telephone answering service console as defined in claim 1, wherein said message racks are fabricated of a plurality of integrally-molded shell members, each shell member having a substantially rectangular back portion, a bottom wall portion, and opposed sidewall portions extending from the ends of said bottom wall portion to a distance substantially short of the full extent of said back wall portion, a plurality of said shell members being secured together in front-to-back, vertically staggered relation to provide a plurality of vertically arranged, open-topped message slip receptacles defined between adjacent pairs of said shell members.

7. A telephone answering service console as defined in claim 6, wherein said opposed sidewall portions of each of said shell members are formed with opposingly inwardly-directed, horizontally-extending edges adapted to frictionally engage opposed vertical edge portions of message slips.

8. A telephone answering service console as defined in claim 1, wherein said directory deck is formed with a symmetrically-arranged, arranged, arcuate recess facing the front of the console, and wherein said plurality of subscriber account name directories are arranged in arcuate disposition in substantially uniformly spaced relation with respect to said directory deck recess.

9. A telephone answering service console as defined in claim 8, wherein said plurality of message slip racks are disposed in arcuate disposition following a curve symmetrical with and having substantially the same center of curvature as said arcuate recess in said directory deck.

10. A telephone answering service console as defined in claim 9, wherein said call receiving and switching means comprises a main control panel arranged at one side of said subscriber account numerical directory and an auxiliary control panel arranged at the other side of subscriber account numerical directory.

* * * * *